US006057385A

United States Patent [19]

Syutara et al.

[11] Patent Number: 6,057,385

[45] Date of Patent: *May 2, 2000

[54] THERMAL TRANSFER INK, AND THERMAL TRANSFER INK RIBBON

[75] Inventors: Yoichi Syutara; Morio Sekiguchi; Satoshi Fujimaki, all of Tochigi, Japan

[73] Assignee: Sony Chemicals Corporation, Tochigi, Japan

[ * ] Notice: This patent is subject to a terminal disclaimer.

[21] Appl. No.: 09/389,128

[22] Filed: Sep. 2, 1999

Related U.S. Application Data

[63] Continuation of application No. 08/894,538, Aug. 21, 1997, Pat. No. 5,977,208.

[30] Foreign Application Priority Data

Feb. 8, 1996 [JP] Japan .................................... 8-46655

[51] Int. Cl.$^{7}$ .......................... C09D 11/02; B32B 5/16; B32B 27/42; C08G 12/30

[52] U.S. Cl. ........................ 523/160; 428/195; 428/207; 428/913; 525/443

[58] Field of Search .................................. 523/160, 161; 428/195, 207, 913; 525/165, 443

[56] References Cited

U.S. PATENT DOCUMENTS

| | | | |
|---|---|---|---|
| 4,522,203 | 6/1985 | Mays | 128/849 |
| 4,670,307 | 6/1987 | Onishi et al. . | |
| 4,826,717 | 5/1989 | Kohashi et al. . | |
| 5,110,389 | 5/1992 | Hiyoshi et al. . | |
| 5,268,347 | 12/1993 | Okumura et al. . | |
| 5,376,433 | 12/1994 | Fujimaki . | |
| 5,399,452 | 3/1995 | Takegawa . | |
| 5,508,108 | 4/1996 | Tokiyoski et al. . | |
| 5,569,540 | 10/1996 | Hirose et al. . | |
| 5,800,914 | 8/1998 | Shiokawa et al. . | |
| 5,879,790 | 3/1999 | Sogabe et al. | 428/213 |

FOREIGN PATENT DOCUMENTS

| | | |
|---|---|---|
| 63-1593 | 6/1986 | Japan . |
| 63-268691 | of 1987 | Japan . |
| 64-34784 | of 1987 | Japan . |
| 1-258987 | of 1988 | Japan . |
| 3-79384 | of 1989 | Japan . |
| 3-9885 | 6/1989 | Japan . |
| 0 414 225 A2 | 8/1989 | Japan . |
| 0 414 225 A3 | 8/1989 | Japan . |
| 3-239589 | 2/1990 | Japan . |
| 5-131754 | 11/1991 | Japan . |
| 5-286272 | 4/1992 | Japan . |
| 8-238846 | 3/1995 | Japan . |

OTHER PUBLICATIONS

Patent Abstracts of Japan vol. 13, No. 217 (M–828) (3565) May 22, 1989, & JP A 1 34784 (Matsushita Electric Ind Co Ltd) Feb. 06, 1989.

Database UWPIL, No. 88–357656, Derwent & JP A 63 268691 (Toppan Printing KK) Jul. 11, 1988.

Patent Abstracts of Japan vol. 13, No. 28 (M–788) 3376) Jan. 23, 1989, & JP A 63 239088 (Dianippon Printing Co Ltd) Oct. 5, 1988.

US A 4 771 035 (Y Murata et al) col. 3, lines 53–60, Sep. 1998.

Aldrich Catalog; Aldrich Chemical Company Milwaukee, WI (p. 1073), 1990.

*Primary Examiner*—Vasu Jagannathan
*Assistant Examiner*—Callie E. Shosho
*Attorney, Agent, or Firm*—Hill & Simpson

[57] ABSTRACT

The present invention provides a thermal transfer ink ribbon which has good ink transferability and is capable of producing transferred images which are sharp and have high durability. As the main constituent of a binding material of thermally fusible resin, fine particles of low slipperiness which are not softened at a temperature at which the binding material is softened are contained in an ink layer 13 when the ink layer 13 is deposited to produce a thermal transfer ink ribbon 1. Since the thermally fusible resin is used, the durability of transferred images is high. Because the fine particles are contained, the ink layer can be separated sharply from the thermal transfer ink ribbon 1. As the fine particles are of low slipperiness, no slippage occurs between the thermal transfer ink ribbon 1 and a transfer medium. The fine particles of low slipperiness have an average diameter ranging from 0.3 $\mu$m to 3.0 $\mu$m, and are made of one or more of a condensation resin of benzoguanamine and formaldehyde, a condensation resin of melamine and formaldehyde, a condensation resin of benzoguanamine, melamine, and formaldehyde, and tetrafluoroethylene. The fine particles of low slipperiness may be contained in the ink layer 13 in an amount exceeding 10% by weight and less than 60% by weight, or preferably in an amount ranging from 20% by weight to 50% by weight.

3 Claims, 1 Drawing Sheet

THERMAL TRANSFER INK, AND THERMAL TRANSFER INK RIBBON

The present case is a Continuation Application of application Ser. No. 08/894,538, filed on Aug. 21, 1997, now U.S. Pat. No. 5,977,208.

TECHNICAL FIELD

The present invention relates to a thermal transfer ink useful for a thermal transfer recording process which employs a thermal head, etc., and a thermal transfer ink ribbon which employs such a thermal transfer ink.

BACKGROUND ART

At present, thermal transfer recording processes which employ heating units such as thermal heads, etc. are widely practiced in recording devices such as printers as computer terminals, word processors, facsimile machines, copying machines, etc. Those thermal transfer recording processes are classified into a thermal transfer recording process which employs heat-resistive paper and a thermal transfer recording process which employs thermal transfer ink ribbon.

The thermal transfer recording process which employs thermal transfer ink ribbon is referred to as thermal fusion and transfer recording process. According to this process, an ink layer is disposed on a base in the shape of a tape, and a transfer medium (printing medium) such as paper is held in intimate contact with the ink layer. A thermal head is applied to the reverse side of the base to heat the base, fusing the ink layer with heat and transferring the ink to the transfer medium. Heretofore, the ink layer comprises a colorant, a filler, etc. which are rendered formable by a binding material (hereinafter referred to as a binder) that mainly comprises wax, and is deposited on the base to a thickness of several μm.

In recent years, transferred images that are printed using such a thermal transfer ink ribbon have been required to be highly sharp in appearance. Since sharper transferred images can be obtained as the ink layer has a greater ability to be separated sharply from the base, it has been attempted to add fine particles of a heat-setting resin such as silicone resin or the like to the ink layer of the thermal transfer ink ribbon whose binder main comprises wax for thereby improving the ability of the ink layer to be separated sharply from the base, and such attempts have proven somewhat effective (Japanese laid-open patent publication No. 3-239589).

However, with the thermal transfer ink ribbon whose binder mainly comprises wax, images transferred to a transfer medium by the thermal transfer process are poor in heat resistance and wear resistance, and hence have insufficient durability.

It has been proposed to use a thermally fusible resin, i.e., a thermoplastic resin, instead of wax, as a main constituent of the binder. While the use of a thermoplastic resin is effective to improve the heat resistance and wear resistance of transferred images, however, the ability of the ink layer to be sharply transferred from the base is reduced. In a boundary between an area of the ink layer which has been heated by the thermal head and an area of the ink layer which has not been heated by the thermal head, the ink layer may not sharply be separated from the base, failing to produce a sharp transferred image.

In an effort to solve the above problem with respect to the ability of the ink layer to be sharply separated from the base, the inventors of the present invention have proposed a thermal transfer ink ribbon as disclosed in Japanese laid-open patent publication No. 5-286272.

The disclosed thermal transfer ink ribbon has an ink layer comprising a colorant, a thermoplastic resin, and particles of a fluorine-containing resin or a silicone resin, and allows the ink layer to be separated sharply to produce sharp transferred images while maintaining desired heat resistance and wear resistance thereof.

If the transfer medium constitutes a label, then images transferred using the above thermal transfer ink ribbon may be sharp or not sharp depending on the type of the label, and hence have no constant printing quality. There are various factors which make transferred images not sharp, and it has been desired to analyze the factors and establish measures to eliminate those factors.

DISCLOSURE OF THE INVENTION

The present invention attempts to alleviate the conventional shortcomings described above. It is a first object of the present invention to provide a thermal transfer ink ribbon which is capable of producing sharp transferred images.

A second object of the present invention is to provide a thermal transfer ink ribbon which will increase durability features such as heat resistance, wear resistance, etc. of transferred images.

A third object of the present invention is to provide a thermal transfer ink ribbon which has good ink transferability.

Generally, for printing a transfer medium with a thermal transfer ink ribbon, the thermal transfer ink ribbon and the transfer medium are brought into contact with each other, and the transfer medium is transported by an internal mechanism of a printer to transport the thermal transfer ink ribbon due to frictional engagement with the transfer medium. The inventors of the present invention have tried to find factors responsible for making transferred images not sharp with the thermal transfer ink ribbon disclosed in Japanese laid-open patent publication No. 5-286272, and found that when a transferred image is printed, the thermal transfer ink ribbon slips on the surface of the transfer medium and hence is not properly transported.

With the thermal transfer ink ribbon whose binder mainly comprises wax, the ink layer is soft and kept in intimate contact with a transfer medium which has large surface irregularities when an image is to be printed thereon. No problem has arisen about the ability of the thermal transfer ink ribbon to be transported with the transfer medium.

With the thermal transfer ink ribbon whose binder mainly comprises a thermally fusible resin, however, the ink layer is hard and is highly dependent on the surface irregularities of the transfer medium for the ability to be held in intimate contact with the transfer medium. If the transfer medium has large surface irregularities, therefore, the ability of the thermal transfer ink ribbon to be held in intimate contact with the transfer medium is insufficient, and as a result, friction forces developed between the thermal transfer ink ribbon and the transfer medium are small.

The inventor has found that the thermal transfer ink ribbon whose ink layer comprises a colorant, a thermoplastic resin, and particles of a fluorine-containing resin or a silicone resin tends to slip against the transfer medium depending on the type of the transfer medium because the fine particles which produce small frictional forces are added to the ink layer which produces small frictional forces, reducing the coefficient of friction of the surface of the ink layer to a level smaller than would be if the fine particles were not added.

Therefore, if the main constituent of the binder of the thermal transfer ink is a thermally fusible resin, then fine particles of low slipperiness may be added to the ink layer to increase the coefficient of friction of the surface of the ink layer, thereby making the ink layer resistant to slippage. It is expected that the fine particles of low slipperiness will maintain a good ability of the ink layer to be separated sharply from the base when it is transferred to the transfer medium.

The present invention has been devised on the basis of the above findings in order to solve the above problems. According to an invention defined in claim 1, there is provided a thermal transfer ink including a binding material having a thermally fusible resin as a main constituent, characterized in that the thermal transfer ink contains fine particles of low slipperiness comprising a heat-resistant material which is not softened at a temperature at which said binding material is softened.

In the invention defined in claim 1, according to an invention defined in claim 2, the fine particles of low slipperiness may comprise particles of one or more of a condensation resin of benzoguanamine and formaldehyde, a condensation resin of melamine and formaldehyde, a condensation resin of benzoguanamine, melamine, and formaldehyde, and tetrafluoroethylene.

The fine particles of low slipperiness according to the invention defined in claim 1 or 2, according to an invention defined in claim 3, may be contained in the thermal transfer ink in an amount exceeding 10% by weight and less than 60% by weight.

According to an invention defined in claim 4, the fine particles of low slipperiness should preferably be contained in an amount ranging from 20% by weight to 50% by weight.

In the invention defined in any of claims 1 through 4, according to an invention defined in claim 5, the fine particles of low slipperiness may have an average diameter ranging from 0.3 μm to 3.0 μm.

According to an invention defined in claim 6, a thermal transfer ink ribbon may comprise a thermally fusible ink layer disposed on a base, the thermally fusible ink layer comprising the thermal transfer ink according to any one of claims 1 through 5.

With the arrangement of the present invention, the fine particles of low slipperiness contained in the ink layer are not softened at the temperature at which the thermally fusible material, which is a main constituent of the binder (binding material), is softened. Therefore, when the ink layer is thermally transferred, the fine particles are thermally stable and not softened, thereby improving the ability of the ink layer to be separated sharply from the base. Since the surfaces of the fine particles of low slipperiness have a large coefficient of friction (low slipperiness), the ink layer and a transfer medium do not slip against each other, thus allowing images of high printing quality to be transferred from the ink layer to the transfer medium.

The fine particles of low slipperiness may comprise resin particles other than particles of a fluorine-containing resin or a silicone resin, e.g., particles of an acrylic resin, particles of a methacrylic resin, particles of a styrene resin, and particles of an epoxy resin, particles of a tetrafluoroethylene, and also condensed particles produced by a condensation polymerization reaction, e.g. particles of a condensation resin of benzoguanamine and formaldehyde, a condensation resin of melamine and formaldehyde, a condensation resin of benzoguanamine, melamine, and formaldehyde.

It is possible to use, among whose particles, particles of a condensation resin which is stable at the temperature at which the thermally fusible material is softened.

If the particles were contained in the ink layer in an amount of 10% by weight or lower, then the particles would cause increased slippage, and if the particles were contained in the ink layer in an amount of 60% by weight or higher, then the thermal sensitivity of the thermal transfer ink would be lowered, imposing an increased load on a thermal head. Therefore, it is necessary that the particles be contained in an amount exceeding 10% by weight and less than 60% by weight. It is particularly preferable that the particles be contained in an amount ranging from 20% by weight to 50% by weight.

Preferably, the average diameter of the fine particles of low slipperiness should not be too large with respect to the thickness of the ink layer. Practically, the thickness of the ink layer is usually in the range of from 0.3 μm to 10.0 μm. The average diameter of the fine particles of low slipperiness is preferably smaller than the thickness of the ink layer which contains the fine particles of low slipperiness, and more preferably should range from 0.3 μm to 3.0 μm.

The thermally fusible resin contained as a main constituent of the binder of the thermal transfer ink has a melting point of 150° C. or lower, preferably 120° C. or lower, and more preferably ranging from 100° C. to 120° C. Specifically, the thermally fusible resin may comprise one or more of polyester, polyamide, acrylic resin, vinyl chloride, EEA (ethylene acrylate copolymer), EVA (ethylene-vinyl acetate copolymer), terpene, petroleum resin, SIS (styrene-isoprene-styrene copolymer), SBS (styrene-butadiene-styrene copolymer), etc. If these thermally fusible resins are used as a main constituent of the binder, then transferred images will have better durability features such as heat resistance, wear resistance, etc. than would be if wax were used, and will be sharp and have high printing quality in combination with the ability of the ink layer to be separated sharply from the base.

A colorant contained in the thermal transfer ink may be any of pigments and dyes which have heretofore been used for thermal fusion and transfer recording processes. For example, the colorant may comprise one or more of carbon black, fast yellow G, disazoyellow AAA, brilliant carmine 6B, phthalocyanine blue, titanium oxide, bronze, aluminum, etc.

The thermal transfer ink may also comprise other constituents including wax such as carnauba wax, candelilla wax, beeswax, paraffin wax, etc., a plasticizer, a dispersant, etc.

Figure 1:
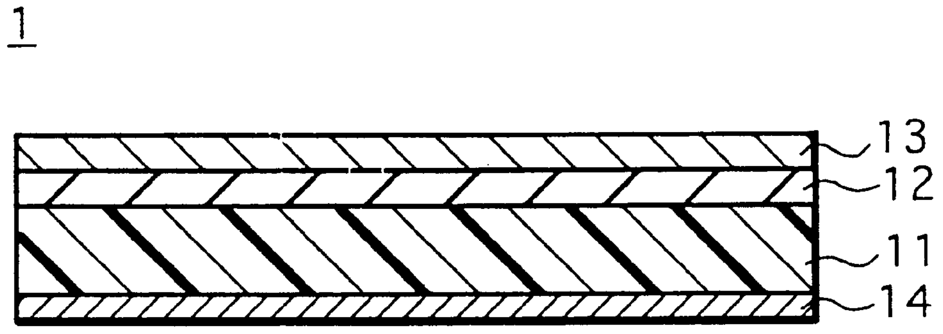
FIG. 1 is a view showing by way of example a thermal transfer ink ribbon according to the present invention.

A thermal transfer ink ribbon according to the present invention is designated by the reference numeal 1 in FIG. 1. The thermal transfer ink ribbon 1 comprises a peel-off layer 12 and a thermally fusible ink layer 13 successively disposed in the order named on a surface of a sheet-like base 11. When a transfer medium such as a recording sheet of paper is held in intimate contact with the thermally fusible ink layer 13 and the thermally fusible ink layer 13 is fused with heat by a thermal head held in intimate contact with the reverse side of the ink ribbon 1, the thermally fusible ink is transferred uniformly to the transfer medium with low energy because of the peel-off layer 12, forming a transferred image on the transfer medium.

Since a protective layer 14 is mounted on the reverse side of the base 11, the thermal head held in intimate contact with the protective layer 14 does not stick to the thermal transfer ink ribbon 1, allowing the thermal transfer ink ribbon 1 to be transported smoothly.

The base 11 is made of polyester film, but may be made of polyimide film, capacitor paper, or the like. The peel-off layer 12 has a main constituent of wax such as carnauba wax, candelilla wax, or the like, and has a melting point ranging from 50° C. to 100° C. The peel-off layer 12 can easily be peeled off when heated. The protective layer 14 is made of a silicone resin, but may be made of a highly heat-resistant resin such as a fluororesin, a nitrocellulose resin, or the like.

Preferably, the base 11 has a thickness ranging from 3.0 to 10.0 μm, the peel-off layer 12 has a thickness ranging from 0.1 to 3.0 μm, the thermally fusible ink layer 13 has a thickness ranging from 0.3 to 10.0 μm, and the protective layer 14 has a thickness ranging from 0.05 to 1.00 μm.

Examples of the present invention will hereinafter be described in specific detail below.

INVENTIVE EXAMPLE 1

3% by weight of Epostar S6 (particles of a condensation resin of melamine and formaldehyde manufactured by Kabushiki Kaisha Nippon Shokubai and having an average diameter of 0.6 μm), 6% by weight of carbon black, 21% by weight of Eliter UE3380 (polyester resin manufactured by Unitika Kabushiki Kaisha), and 70% by weight of MEK were mixed, thereby preparing a thermal transfer ink.

Then, a polyester film having a thickness of 5.0 μm was used as a base 11, and a protective layer 14 made of an acrylic-silicone resin was deposited on the reverse side of the base 11. A peel-off layer 12 made of 90% by weight of ester wax and 10% by weight of a copolymer of ethylene and vinyl acetate was deposited on the base 11, and then coated with the above thermal transfer ink, which was dried into a thermally fusible ink layer 13 having a thickness of 2.0 μm, thereby producing a thermal transfer ink ribbon 1.

A polyester label (50 WH manufactured by Lintec K.K.) was printed with the produced thermal transfer ink ribbon 1 and a bar-code printer (BC-8mkII manufactured by Autonics K.K.), and then evaluated for thermal sensitivity, printing quality, and an amount of ribbon slippage.

Figure 2:
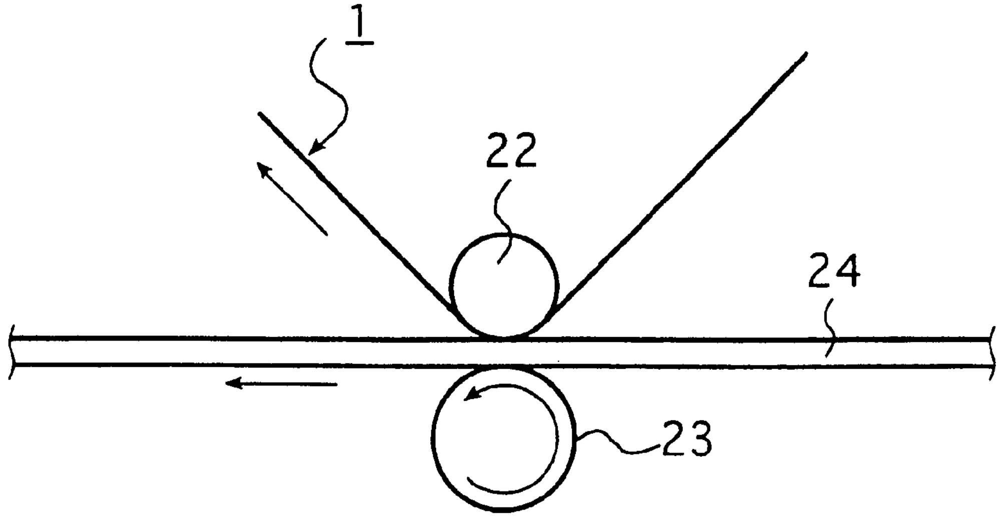
FIG. 2 is a view illustrative of a measuring method. Best mode for carrying out the invention.

As shown in FIG. 2, the bar-code printer comprises a thermal head 22 and a platen 23 with the thermal transfer ink ribbon 1 and a transfer medium 24 being sandwiched therebetween. The platen 23 is rotated to transport the transfer medium 24 for thereby printing the transfer medium 24 and feeding the thermal transfer ink ribbon 1. If there is slippage occurring between the thermal transfer ink ribbon 1 and the transfer medium 24, then the transfer medium 24 travels a greater distance than the thermal transfer ink ribbon 1.

The thermal head 22 is arranged to print 8 dots in an interval of 1 mm.

INVENTIVE EXAMPLE 2

6% by weight of Epostar S6 (particles of a condensation resin of melamine and formaldehyde manufactured by Kabushiki Kaisha Nippon Shokubai and having an average diameter of 0.6 μm), 6% by weight of carbon black, 18% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 3

9% by weight of Epostar S6 (particles of a condensation resin of melamine and formaldehyde manufactured by Kabushiki Kaisha Nippon Shokubai and having an average diameter of 0.6 μm), 6% by weight of carbon black, 15% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 4

12% by weight of Epostar S6 (particles of a condensation resin of melamine and formaldehyde manufactured by Kabushiki Kaisha Nippon Shokubai and having an average diameter of 0.6 μm), 6% by weight of carbon black, 12% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 5

15% by weight of Epostar S6 (particles of a condensation resin of melamine and formaldehyde manufactured by Kabushiki Kaisha Nippon Shokubai and having an average diameter of 0.6 μm), 6% by weight of carbon black, 9% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 6

15% by weight of Epostar S6 (particles of a condensation resin of melamine and formaldehyde manufactured by Kabushiki Kaisha Nippon Shokubai and having an average diameter of 0.6 μm), 6% by weight of carbon black, 9% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 7

6% by weight of Epostar S (particles of a condensation resin of melamine and formaldehyde manufactured by Kabushiki Kaisha Nippon Shokubai and having an average diameter of 0.3 μm), 6% by weight of carbon black, 18% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 8

6% by weight of Epostar S12 (particles of a condensation resin of melamine and formaldehyde manufactured by Kabushiki Kaisha Nippon Shokubai and having an average diameter of 1.2 μm), 6% by weight of carbon black, 18% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 9

6% by weight of Epostar MS (particles of a condensation resin of benzoguanamine and formaldehyde manufactured by Kabushiki Kaisha Nippon Shokubai and having an average diameter of 2.0 μm), 6% by weight of carbon black, 18% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 10

6% by weight of Epostar M30 (particles of a condensation resin of benzoguanamine, melamine, and formaldehyde manufactured by Kabushiki Kaisha Nippon Shokubai and having an average diameter of 3.0 μm), 6% by weight of carbon black, 18% by weight of Eliter UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

INVENTIVE EXAMPLE 11

6% by weight of Epostar MA1001 (particles of a polymethyl methacrylate resin manufactured by Kabushiki Kaisha Nippon Shokubai and having an average diameter of 1~2 μm), 6% by weight of carbon black, 18% by weight of Elitel UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

COMPARATIVE EXAMPLE 1

6% by weight of carbon black, 24% by weight of Elitel UE3380 (polyester resin manufactured by Unitika Kabushiki Kaisha), and 70% by weight of MEK were mixed, thereby preparing a thermal transfer ink. A theral transfer ink ribbon 1 was produced and evaluated in the same manner as with Example 1.

COMPARATIVE EXAMPLE 2

6% by weight of KTL-8 (particles of tetrafluoroethylene manufactured by Kabushiki Kaisha Kitamura and having an average diameter of 3.0 μm), 6% by weight of carbon black, 18% by weight of Elitel UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

COMPARATIVE EXAMPLE 3

6% by weight of Tospal (particles of a silicone resin manufactured by Toshiba Silicone Kabushiki Kaisha and having an average diameter of 0.8 μm), 6% by weight of carbon black, 18% by weight of Elitel UE3380 (polyester resin manufactured by Unitika Kabushiki Kaisha), and 70% by weight of MEK were mixed, thereby preparing a thermal transfer ink. A thermal transfer ink ribbon 1 was produced and evaluated in the same manner as with Example 1.

RESULTS OF EVALUATION

Results of evaluation are given in Table 1 below.

TABLE 1

Results of evaluation of Inventive and Comparative Examples

| | Composition of fine particles | Particle diameter (μm) | Content (%) | Printed result at 20 mj/mm$^2$ | Optimum-heat energy (mj/mm$^2$) | Tail length (μm) | Printing quality | Amount of slippage (μm) | Slippage evaluation |
|---|---|---|---|---|---|---|---|---|---|
| In.Ex. 1 | A | 0.6 | 10 | ○ | 13 | 37 | x | 13.3 | x |
| In.Ex. 2 | A | 0.6 | 20 | ○ | 14 | 0 | ○ | 1.3 | ○ |
| In.Ex. 3 | A | 0.6 | 30 | ○ | 15 | 5 | ○ | 2.0 | ○ |
| In.Ex. 4 | A | 0.6 | 40 | ○ | 17 | 7 | ○ | 1.1 | ○ |
| In.Ex. 5 | A | 0.6 | 50 | ○ | 19 | 5 | ○ | 0.5 | ○ |
| In.Ex. 6 | A | 0.6 | 60 | x | 23 | 3 | ○ | 1.7 | ○ |
| In.Ex. 7 | A | 1.3 | 20 | ○ | 14 | 8 | ○ | 2.5 | Δ |
| In.Ex. 8 | A | 1.2 | 20 | ○ | 14 | 4 | ○ | 0.7 | ○ |
| In.Ex. 9 | B | 2.0 | 20 | ○ | 15 | 4 | ○ | 0.7 | ○ |
| In.Ex. 10 | C | 3.0 | 20 | ○ | 17 | 4 | ○ | 0.7 | ○ |
| In.Ex. 11 | D | 1.5 | 20 | ○ | 15 | 4 | ○ | 4.0 | Δ |
| Co.Ex. 1 | Not added | — | 0 | ○ | 13 | 32 | ○ | 16.3 | x |
| Co.Ex. 2 | E | 3.0 | 20 | ○ | 16 | 4 | ○ | 30.0 | x |
| Co.Ex. 3 | F | 0.8 | 20 | ○ | 14 | 3 | ○ | 21.5 | x |

A . . . condensation resin of benzoguanamine and formaldehyde
B . . . condensation resin of melamine and formaldehyde
C . . . condensation resin of benzoguanamine, melamine, and formaldehyde
D . . . polymethyl methacrylate resin
(A–B: fine particles of low slipperiness)
E . . . tetrafluoroethylene
F . . . silicone resin
(E, F: conventional fine particles)

Kabushiki Kaisha), and 70% by weight of MEK were mixed, thereby preparing a thermal transfer ink. A thermal transfer ink ribbon 1 was produced and evaluated in the same manner as with Example 1.

The printed result at 20 mj/mm$^2$ was achieved when the thermal head 22 was arranged to generate heat with an energy of 20 mj/mm$^2$. It was evaluated as ○ when a void (white dot) was not visually observed and as × when visually observed.

However, even when no void was observed, images printed with the energy of 20 mj/mm$^2$ in those examples where the optimum heat energy was too low were solid black due to the excessive energy, and had poor printing quality.

In Table 1, the optimum heat energy was represented by heat energy converted from settings of the thermal head 22 when printed results of best printing quality were obtained. Generally, if the optimum heat energy is too high, then the thermal head will be damaged. Therefore, it has been considered that the optimum heat energy should preferably be 20 mj/mm$^2$ or less.

The tail length indicates whether the ability of the thermally fusible ink layer to be separated from the base is good or not. As the tail length is smaller, transferred images are sharper and have better printing quality. In Table 1, those examples whose tail length was 10 μm or less were evaluated as ○ because of good printing quality, and those examples whose tail length was more than 10 μm were evaluated as x because of poor printing quality.

The amount of slippage was represented by a distance which the thermal transfer ink ribbon 1 failed to travel when the distance which the transfer medium 24 traveled was 10 cm. The slippage evaluation was marked ○ for those examples where the difference between the distances which the thermal transfer ink ribbon 1 and the transfer medium 24 traveled was less than 2.0%, Δ for those examples where the difference between the distances which the thermal transfer ink ribbon 1 and the transfer medium 24 traveled was 2.0% or more and less than 5.0%, and × for those examples where the difference between the distances which the thermal transfer ink ribbon 1 and the transfer medium 24 traveled was 5.0% or more. In the Inventive and Comparative Examples, the transfer medium 24 comprised the same polyester label.

As can be seen from the results shown in Table 1, the thermal transfer ink ribbons (Inventive Examples 1~11) which employed the thermal transfer ink according to the present invention used a thermally fusible resin as a main constituent of the binder. Therefore, they provide excellent durability features such as heat resistance, wear resistance, etc. for the printed documents. Because they contained fine particles of low slipperiness, the ink layer was separated sharply from the base when transferred onto the transfer medium, producing sharp transferred images of high printing quality.

In the above embodiment, the fine particles of low slipperiness are made of a selected one of a condensation resin of benzoguanamine and formaldehyde, a condensation resin of melamine and formaldehyde, and a condensation resin of benzoguanamine, melamine, and formaldehyde, and are contained in the thermally fusible ink layer. However, the fine particles of low slipperiness may be made of two or more of those condensation resins, and may be contained in one thermally fusible ink layer.

The fine particles of low slipperiness should be spherical in shape, but may be of various shapes including a scaly shape, an irregular shape, etc.

INDUSTRIAL APPLICABILITY

As described above, since the main constituent of a thermal transfer ink according to the present invention is a thermoplastic resin, transferred images produced when the thermal transfer ink and a thermal transfer ink ribbon which employs the thermal transfer ink have increased durability features such as heat resistance, wear resistance, etc. Therefore, the thermal transfer ink and the thermal transfer ink ribbon can be used in a wide variety of applications.

Since the fine particles of low slipperiness are employed, the ink layer has a good ability to be separated sharply from the base, transferred images have high printing quality, and no slippage occurs when images are transferred. Since the transferred images are sharp, the thermal transfer ink and the thermal transfer ink ribbon can be used in applications where precision printing is required, e.g., bar-code printing.

Inasmuch as the thermal transfer ink and the thermal transfer ink ribbon have good thermal transferability, they can be used conveniently and can find a wide variety of applications including printers, word processors, and various devices.

We claim:

1. A thermal transfer ink ribbon comprising a base film having a surface, peel-off layer disposed on the surface, and thermally fusible ink layer disposed on the peel-off layer, and wherein said ink layer comprises a colorant, a thermally fusible resin binder having a melting point from 100° C. to 150° C., and from greater than about 10% to about 60% by weight, based on solids of the ink layer, of fine polymer particles selected from the group consisting of a condensation resin of benzoguanamine and formaldehyde, a condensation resin of melamine and formaldehyde, and a condensation resin of benzoguanamine, melamine and formaldehyde, said particles having an average diameter which is less than the thickness of the ink layer.

2. A thermal transfer ink ribbon comprising a base film having a surface, peel-off layer disposed on the surface, and a thermally fusible ink layer disposed on the peel-off layer, and wherein said ink layer consists essentially of a colorant, a thermally fusible resin binder having a melting point from 100° C. to 150° C., and from greater than about 10% to about 60% by weight, based on solids of the ink layer, of fine polymer particles selected from the group consisting of a condensation resin of benzoguanamine and formaldehyde, a condensation resin of melamine and formaldehyde, and condensation resin of benzoguanamine, melamine and formaldehyde, said particles having an average diameter which is less than the thickness of the ink layer.

3. A thermal transfer ink ribbon consisting essentially of a base film having a surface, peel-off layer disposed on the surface, and thermally fusible ink layer disposed on the peel-off layer and wherein said ink layer comprises a colorant, a thermally fusible resin binder from greater than about 10% to about 60% by weight, based on solids of the ink layer, of fine polymer particles selected from the group consisting a condensation resin of benzoguanamine and formaldehyde, a condensation resin of melamine and formaldehyde, and a condensation resin of benzoguanamine, melamine and formaldehyde, said particles having an average diameter which is less than the thickness of the ink layer.

* * * * *

UNITED STATES PATENT AND TRADEMARK OFFICE
CERTIFICATE OF CORRECTION

PATENT NO. : 6,057,385 
DATED : May 2, 2000
INVENTOR(S) : Yoichi Syutara et al.

It is certified that error appears in the above-identified patent and that said Letters Patent is hereby corrected as shown below:

Column 8, Table 1,
Line 61, replace "(A-B: fine particles of low slipperiness)" with -- (A-C: fine particles of low slipperiness) --.

Column 8, Table 1, Column 9,
Lines 39-42, replace "Amount of slippage (μm)" with -- Amount of slippage (mm) --.

Signed and Sealed this

Twentieth Day of November, 2001

*Attest:*

NICHOLAS P. GODICI

*Attesting Officer* *Acting Director of the United States Patent and Trademark Office*